Dec. 5, 1961  J. M. GRUBER  3,011,839
RETAINING MEANS FOR COMPONENTS OF
SELF-LEVELING THRUST BEARINGS
Filed Dec. 9, 1959
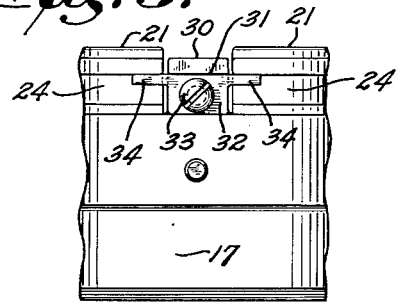
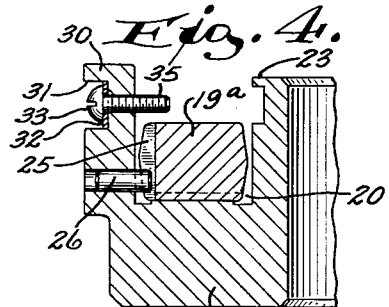
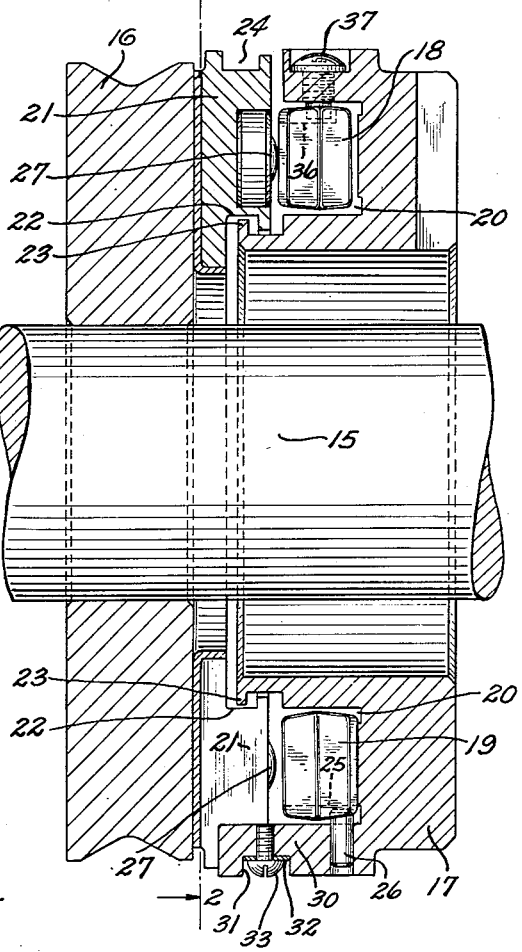
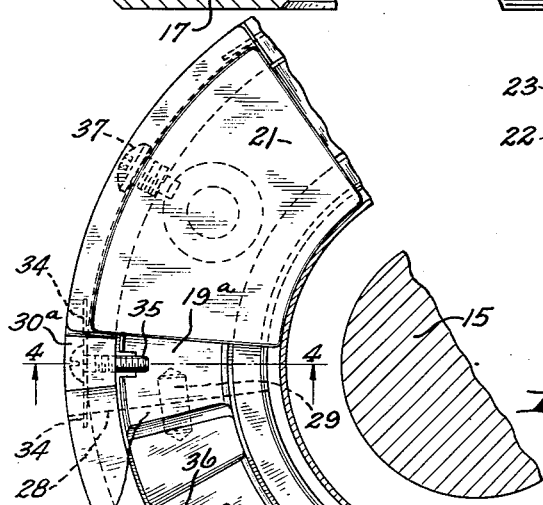
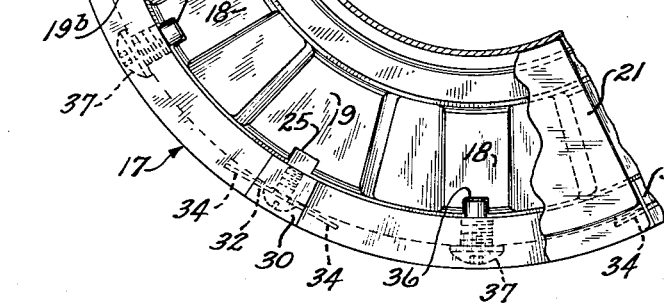
INVENTOR.
Jerome M. Gruber
BY
Morsell & Morsell
ATTORNEYS.

United States Patent Office 3,011,839
Patented Dec. 5, 1961

3,011,839
RETAINING MEANS FOR COMPONENTS OF SELF-LEVELING THRUST BEARINGS
Jerome M. Gruber, Waukesha, Wis., assignor to Waukesha Bearings Corporation, Waukesha, Wis., a corporation of Wisconsin
Filed Dec. 9, 1959, Ser. No. 858,434
6 Claims. (Cl. 308—160)

This invention relates to improvements in retaining means for components of self-leveling thrust bearings.

The holding of thrust pads and leveling links in assembly in a thrust bearing of the self-leveling type has presented a problem. During original assembly of the thrust bearing, as well as during periods of inspection and repair, after the bearing is in use, there is the ever present danger of dropping thrust pads or leveling links into oil drains, gear-teeth, pump cavities, generator housings or the like.

It is a general object of the present invention to provide an improved self-leveling thrust bearing embodying novel means for holding the thrust pads against displacement, and novel means for retaining the leveling links in place.

A more specific object of the invention is to provide in a thrust bearing having spaced peripheral posts separating the several thrust pads, novel retainer clips on the posts, each clip having an arm projecting into overlapping engagement with one thrust pad and an opposite arm projecting into overlapping engagement with an adjacent thrust pad, the engagement being such as to allow the required free movement of the pads.

A further specific object of the invention is to provide a device as above described wherein the retainer clips are held to the posts by screws, one or more of the screws performing the dual purpose of holding the clip in place on the post, and of preventing the loss of that leveling link which is adjacent the radial joint between the two arcuate sections of the thrust bearing base ring.

A further object of the invention is to provide a novel construction wherein there is a leveling link screw located to coact with an upper leveling link in such a way that all of the upper and lower links are held in place even when all of the thrust pads are removed for inspection.

With the above and other objects in view, the invention consists of the improvements in retaining means for components of self-leveling thrust bearings, and all of its parts and combinations, as set forth in the claims, and all equivalents thereof.

In the accompanying drawing, illustrating one complete embodiment of the preferred form of the invention, in which the same reference numerals designate the same parts in all of the views:

FIG. 1 is a cross-sectional view through one side of a thrust bearing assembly;

FIG. 2 is a fragmentary sectional view taken on the line 2—2 of FIG. 1, one of the thrust pads being broken away and others being removed to expose parts therebelow;

FIG. 3 is a fragmentary peripheral view showing one of the improved retainer clips attached to a peripheral post; and FIG. 4 is a sectional view taken on the line 4—4 of FIG. 2.

Referring more particularly to the drawing, the numeral 15 designates a rotatable shaft of a type which is exposed to thrust loads. The shaft has the usual collar or runner 16 rigid therewith. There may be a thrust bearing assembly cooperating with each side of the collar. For the purposes of the present invention, however, only one thrust bearing assembly has been illustrated. This assembly includes a base ring 17 having sets of upper and lower leveling links 18 and 19 respectively having relatively overlapping ends of the type generally disclosed in Kingsbury Patent No. 1,428,640, carried in an annular groove 20 of the base ring. Each assembly also includes a set of thrust pads or shoes 21 arranged in an arcuate series. The shoes have grooves 22 in their inner peripheries which receive the annular flange 23 of the base ring. The outer peripheries of the shoes are formed with peripheral grooves 24. The illustrated embodiment shows a six-pad thrust bearing. This general type of thrust bearing is well known in the art so all of the details thereof are not being described.

In the illustrated embodiment the lower leveling links are formed on their outer sides with grooves 25 which extend in a generally axial direction of the bearing. Dowel pins 26 projecting from the periphery of the base ring into the base ring groove 20 each have an inner end engaging the groove 25 of a lower leveling link 19 in a manner to maintain the lower leveling links in predetermined circumferential positions while permitting the required movement of the leveling links during use. Each of the shoes has its under side provided with a button or support disc 27 which co-acts with an upper leveling link 18 in the manner shown at the upper part of FIG. 1.

The base ring is formed of two separable arcuate sections connectable on radial joint lines such as the joint line 28 of FIG. 2, there being a connecting dowel 29 at the joint.

The outer periphery of the base ring also includes circumferentially spaced posts 30, each having a peripheral groove 31. The posts project in a generally axial direction of the bearing as is clear from FIG. 1 and extend between pairs of the shoes 21 as is clear from FIG. 3.

As a novel feature of the invention there is a retaining clip 32 detachably secured by a screw 33 in the groove 31 of each post 30. Each retaining clip has laterally projecting arms 34 which extend into the grooves 24 of shoes on each side of a post as is clear from FIG. 3. The arms 34 are of substantially less width than the grooves 24 so do not interfere with the required movement of the shoes. However, the arms effectively prevent the shoes from dropping out during assembly or disassembly of the bearings or during periods of inspection.

Adjacent each of the joint lines 28 is a lower leveling link such as the lower link 19a which has a portion overhanging the joint as at 19b which portion is also overlapped by the end of the adjacent link 18. During assembly or disassembly it has heretofore been a problem to prevent these leveling links such as the link 19a from falling out when the two arcuate sections of the base ring are separated. In order to prevent this, the present invention has posts 30 so located (see post 30a of FIG. 2) as to be adjacent one of these lower leveling links at the joint such as the link 19a. At these particular locations the screws 33, which hold the clips 32 in place, are of extra length to have inwardly projecting ends 35 which overlap the leveling link 19a in the manner shown in FIGS. 2 and 4. This prevents a leveling link which overhangs a joint from tilting out when the two arcuate portions of the thrust bearing are separated at the joint. Thus on some of the posts the screws 33 perform the dual function of removably holding a retaining clip 32 in place and of preventing a lower leveling link at a joint from falling out during assembly and disassembly.

The upper leveling links 18 are provided with grooves 36 which terminate short of the bottom of the upper leveling link as is clear from FIG. 1. Link retaining screws 37 in the outer periphery of the base ring have ends projecting into the annular groove 20 of the base ring and engaging grooves 36 of the upper leveling links. With this arrangement all of the upper and lower leveling links 18 and 19 are held in place even when all of the thrust pads 21 are removed for inspection.

It is apparent that the novel retaining clips 32 hold the pads in place during assembly as well as in the assembled equipment. Due to the novel arrangement, the arms of the clip allow free movement of the pads as they form the oil wedge during use. In addition, the clips 32 can be easily removed and permit the removal of each shoe or pad individually without removing the entire bearing assembly. This saves considerable time and expedites bearing inspection. In addition, it eliminates the danger of having shoes drop out into oil drains, gears, pump cavities, generator housings or the like. Also, the novel retaining clip feature permits the use of clip retaining screws for the dual purpose of holding the clip in place and of preventing the loss of lower leveling links at the joint during assembly and disassembly. In addition to the above, the novel upper leveling link retaining screw arrangement serves to hold all of the upper and lower leveling links in place even when all of the shoes are removed for inspection.

The present invention is designed for use in thrust bearings for both horizontal or vertical disposition in various devices such as motors, pumps, gears, turbines, generators or other heavy equipment.

It is to be understood that the invention is not to be limited to the exact details of the construcion shown and described for obvious modifications will occur to persons skilled in the art.

What I claim is:

1. In a thrust bearing having a base ring with an annular groove, having an annular series of shoes, and having leveling links in the annular groove of said base ring between the base ring and shoes, circumferentially spaced posts on the periphery of said base ring extending axially of the thrust bearing between shoes thereof, a flat stamped retaining clip for each post having laterally projecting arms overlapping the shoes on each side of the post, a screw detachably securing each retaining clip to its post, and means on the shoes cooperating with said arms for preventing displacement of the shoes.

2. In a thrust bearing having a base ring with an annular groove, having an annular series of shoes with peripheral grooves, and having leveling links in the annular groove of said base ring between the base ring and shoes, circumferentially spaced posts on the periphery of said base ring extending axially of the thrust bearing between shoes thereof, each post having a transverse external groove, a retaining clip in the groove of each post having laterally projecting arms engaging the grooves of shoes on each side of the post, and a screw detachably securing each retaining clip to its post and having a head which is accommodated in the post groove.

3. In a thrust bearing having a base ring with an annular groove, having an annular series of shoes with peripheral grooves, and having leveling links in said annular groove of said base ring between the base ring and shoes, said base ring comprising two separable arcuate sections with radial joints between sections, circumferentially spaced posts on the periphery of said base ring extending axially of the thrust bearing between shoes thereof, retaining means for each post and having laterally projecting arms overlapping shoes on each side of the post, means on the shoes cooperating with said arms to prevent displacement of the shoes, and a screw detachably connecting each retaining clip to its post, at least one of said screws having an inner end projecting through the post into the annular groove of the base ring in overlapping relationship with a leveling link which is adjacent a radial joint to prevent the leveling link from falling out when the base ring sections are separated.

4. In a thrust bearing having a base ring with an annular groove, having an annular series of shoes with peripheral grooves, and having leveling links in said annular groove of said base ring between the base ring and shoes, said base ring comprising two separable arcuate sections with radial joints between sections, circumferentially spaced posts on the periphery of said base ring extending axially of the thrust bearing between shoes thereof, retaining means for each post and having laterally projecting arms engaging the grooves of shoes on each side of the post, and a screw detachably connecting each retaining clip to its post, and means projecting from the back of a post into the annular groove of the base ring in overlapping relationship with a leveling link which is adjacent a radial joint to prevent the leveling link from falling out when the base ring sections are separated.

5. In a thrust bearing having a base ring with an annular groove, having an annular series of shoes with peripheral grooves, and having leveling links in said annular groove of said base ring between the base ring and shoes, circumferentially spaced posts on the periphery of said base ring extending axially of the thrust bearing between shoes thereof, each post being peripherally grooved in general alinement with the peripheral grooves of the shoes, and a retaining clip detachably secured in the groove of each post and having arms projecting from the ends of the post groove and engaging the grooves of shoes on each side of the post.

6. In a thrust bearing having a base ring with an annular groove, having an annular series of shoes with peripheral grooves, and having upper and lower leveling links in said annular groove of said base ring between the base ring and shoes, said base ring comprising two separable arcuate sections with radial joints between sections, circumferentially spaced posts on the periphery of said base ring extending axially of the thrust bearing between shoes thereof, retaining means for each post and having laterally projecting arms engaging the grooves of shoes on each side of the post, a screw detachably connecting each retaining clip to its post, at least one of said screws having an inner end projecting through the post into the annular groove of the base ring in overlapping relationship with a leveling link which is adjacent a radial joint to prevent the leveling link from falling out when the base ring sections are separated, said upper leveling links having outer peripheries provided with grooves which extend axially of the bearing and which terminate short of the bottoms of the upper links, and spaced retaining screws in the periphery of the base ring having inner ends projecting into the base ring groove, each retaining screw having an end engaging a groove of a leveling link to maintain all of the leveling links in position when the shoes are removed.

References Cited in the file of this patent

UNITED STATES PATENTS

| | | |
|---|---|---|
| 1,117,500 | Kingsbury | Nov. 17, 1914 |
| 1,465,988 | Kingsbury | Aug. 28, 1923 |
| 1,682,189 | Schein | Aug. 28, 1928 |
| 2,091,207 | Kingsbury | Aug. 24, 1937 |
| 2,874,007 | Cametti et al. | Feb. 17, 1959 |